United States Patent
Gingerich et al.

(10) Patent No.: US 6,395,196 B1
(45) Date of Patent: May 28, 2002

(54) PROCESS FOR PRODUCING ELECTROLUMINESCENT PHOSPHOR WITH EXTENDED HALF-LIFE

(75) Inventors: Richard G. W. Gingerich; Clarence D. Vanderpool, both of Towanda, PA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/609,525

(22) Filed: Jul. 3, 2000

(51) Int. Cl.[7] .................. C09K 11/54; C09K 11/56; C09K 11/08
(52) U.S. Cl. .................. 252/301.6 S; 252/301.4 R; 252/301.4 S; 252/301.4 P; 252/301.4 F; 252/301.4 H; 252/301.5; 252/301.6 R; 252/301.6 P
(58) Field of Search .................. 252/301.4 R, 301.4 S, 252/301.4 P, 301.4 H, 301.5, 301.6 R, 301.6 S, 301.6 P, 301.6 F

(56) References Cited

U.S. PATENT DOCUMENTS 4,263,339 A * 4/1981 Fischer .................. 252/301.6 S

FOREIGN PATENT DOCUMENTS

JP          53-141186       * 12/1978

* cited by examiner

Primary Examiner—C. Melissa Koslow
(74) Attorney, Agent, or Firm—William H. McNeill

(57) ABSTRACT

An electroluminescent phosphor with an extended half-life is created by means of the present invention by taking an amount of a phosphor and treating it with antimony comprising the steps of placing an amount of antimony in an inert reaction vessel, placing a vapor permeable filter on top of the antimony, placing a phosphor with a given half-life on top of the vapor permeable filter, evacuating the reaction vessel below one atmosphere and heating it for a period of time to allow the antimony to react with the phosphor to produce a new phosphor with an extended half-life.

5 Claims, No Drawings

PROCESS FOR PRODUCING ELECTROLUMINESCENT PHOSPHOR WITH EXTENDED HALF-LIFE

TECHNICAL FIELD

This application generally relates to a process for producing an electroluminescent phosphor and, more particularly, to a process that produces a phosphor having an extended half-life.

BACKGROUND ART

Electroluminescent phosphors are used for backlighting in LCD's, in copying machines, for backlighting membrane switches, for automotive dashboard and control switch illumination, for automotive exterior body lighting, for aircraft style information panels, for aircraft information lighting, and for emergency egress lighting. U.S. Pat. Nos. 3,014,873; 3,076,767; 4,859,361; 5,009,808 and 5,110,499 relate to methods for producing electroluminescent phosphors. The methods described in these patents result in electroluminescent phosphors that have achieved general commercial success; however, the lifetimes of these phosphors have left something to be desired. Since the cost of replacing devices utilizing these phosphors can be substantial, it would be an advance in the art to provide phosphors having a greater life expectancy.

DISCLOSURE OF THE INVENTION

It is an object of the present invention to obviate the disadvantages of the prior art.

It is an object of the present invention to produce electroluminescent phosphors with a longer half-life than those heretofore produced. As used herein the half-life of a phosphor is that period of time for a given phosphor's light output to decrease to one half that of its original brightness.

This invention achieves these and other objects, in one aspect of the invention, by reacting an uncoated electroluminescent phosphor with antimony. The reaction takes place under the following conditions: A supply of antimony is placed in the bottom of an inert reaction vessel. A vapor permeable filter is placed on top of the antimony and a supply of an uncoated electroluminescent phosphor with given half-life is deposited on top of the vapor permeable filter. The reaction vessel is evacuated below one atmosphere and then heated to allow the antimony to react with the phosphor to produce a new phosphor with a half-life greater than the original phosphor.

BEST MODE FOR CARRYING OUT THE INVENTION

For a better under understanding of the present invention, together with other and further objectives, advantages and capabilities thereof, reference is made to the disclosure and claims in connection with the following description of some of the aspects of the invention.

The extended half-life of the electroluminescent phosphor gained by the practice of the process is shown by the examples in TABLE I:

TABLE I

| Sample | Element | Temp °C. | Time hrs. | Color X | Color Y | Light Output 24 Ft. Lamberts | Light Output 100 Ft. Lamberts | half-life Hours | % Improved |
|---|---|---|---|---|---|---|---|---|---|
| 424-27-C | Control | | | .184 | .435 | 31.6 | 26.9 | 652 | |
| 424-27-2 | Vac Treatment | 500 | 72 | .193 | .471 | 31.1 | 23.9 | 390.5 | |
| 424-76-1 | Vac Treat with Sb | 700 | 98 | .201 | .440 | 16.0 | 12.35 | 321.1 | |
| 449-11-1 | Vac Treat with Sb | 500 | 72 | .197 | .447 | 20.7 | 20.1 | 2317.7 | 5.9× |
| 449-78-1 | Vac Treat with Sb | 600 | 96 | .194 | .412 | 7.0 | 6.9 | >990.8 | |
| 449-90-1 | Vac Treat with Sb | 500 | 96 | .191 | .427 | 18.2 | 16.9 | 941.0 | 2.4× |
| 484-5-2 | Vac Treat with Sb | 500 | 48 | .191 | .418 | 18.3 | 16.8 | 1105 | 2.4× |
| 484-5-1 | Vac Treat with Sb | 500 | 288 | .193 | .434 | 14.3 | 13.1 | 863.8 | 2.2× |
| 484-8-1 | Vac Treat with Sb | 500 | 24 | .191 | .422 | 17.5 | 17.9 | 1637.2 | 4.19× |
| 484-32-2 | Vac Treat with Sb | 500 | 96 | .195 | .452 | 22.0 | 21.1 | 1235.6 | 3.16× |
| 505-17-1 | Vac Treat with Sb | 450 | 24 | .195 | .443 | 34.2 | 29.9 | 767.5 | 1.9× |
| 505-17-2 | Vac Treat with Sb | 450 | 7 | .189 | .424 | 29.1 | 25.1 | 687.9 | 1.76× |
| 505-12-1 | Vac Treat with Sb | 475 | 24 | .196 | .445 | 28.8 | 25.4 | 960.2 | 2.46× |
| 505-12-2 | Vac Treat with Sb | 475 | 14 | .195 | .445 | 29.2 | 25.7 | 990.2 | 2.54× |
| 484-32-3 | Vac Treat with Sb | 475 | 96 | .195 | .437 | 23.4 | 22 | 1225.2 | 3.13× |

In Table I, the color coordinates are from the standard C.I.E. Chromaticity Diagram; the Light Output is at the 24 hour and 100 hour periods and the ratings are in Ft. Lamberts; and the % Improved column figures are derived from the half-life of the indicated sample divided by the half-life of the vacuum fired control, Sample 424-27-2.

As can be seen from the table, when the electroluminescent phosphor prepared by the process claimed in this invention is compared to the non-treated, vacuum fired electroluminescent phosphor the phosphor treated with antimony has an extended half-life.

This invention provides a process for producing an electroluminescent phosphor that has an extended half-life. The invention is especially suited for zinc sulfide, copper activated phosphors or other zinc sulfide phosphors where copper is a co-activator. The method for producing the beginning phosphor comprised heating zinc sulfide in a furnace to an elevated temperature in the presence of a copper activator and halide fluxes to achieve an electroluminescent phosphor, cooling the phosphor to ambient temperature and washing the phosphor to remove the flux. The resulting ZnS:Cu phosphor was then dried. Phosphors created by this method are generally known. One such phosphor is a Type 723 electroluminescent phosphor (ZnS:Cu) available from Osram Sylvania, Inc., Towanda, Pa. Generally, the method is practiced by taking elemental antimony (Sb) and placing it in the bottom of an inert reaction vessel. In a preferred embodiment, a thick walled quartz glass tube is used but other inert reaction vessels may be used. The antimony is then covered with a vapor permeable filter, such as quartz wool, that allows vapor from the antimony to pass through A phosphor is placed on top of the wool plug. As noted above, in this specific embodiment a type 723 ZnS:Cu electroluminescent phosphor was used. The inert reaction vessel was then evacuated down below one atmosphere and sealed. The inert reaction vessel was then heated for a period of time allowing antimony vapor to pass through the vapor permeable filter and react with the phosphor thereby creating a new phosphor with a half-life greater than that of the original phosphor.

To more fully illustrate this invention, the following non-limiting example is presented .

EXAMPLE 1. 4 grams of elemental antimony were placed on the bottom of a thick-walled quartz tube. The antimony was then covered with a plug of quartz wool. 25 grams of Osram Sylvania, Inc., Type 723 uncoated electroluminescent phosphor were placed on top of the wool plug. The tube was sealed and evacuated down to 25 mm Hg. The tube was then heated to a temperature of 500° C. for 72 hours. The new electroluminescent phosphor created by this process (Sample 449-11-1 in Table I) had a half-life of 2,317.7 hours as compared to a 390.5 hour half-life for the vacuum fired control (Sample 424-27-2 in Table I) created by the same process but not allowed to react with antimony. This is an astonishing improvement of almost 6-fold.

As will be seen from Table I, there is a definite correlation between the amount of the improvement in the half-life and the firing time and temperature.

Thus there is provided a process for producing an electroluminescent phosphor with an extended half-life.

While there have been shown and described what are at present considered the preferred embodiments of the invention, it will be apparent to those skilled in the art that various changes and modifications can be made herein without departing from the scope of the invention as defined by the appended claims.

What is claimed is:

1. A process for producing an electroluminescent phosphor comprising:

(a) placing an amount of antimony in an inert reaction vessel;

(b) placing a vapor permeable filter on top of the antimony;

(c) placing a phosphor with a given half-life on top of the filter;

(d) evacuating the vessel below one atmosphere;

(e) heating the vessel for a period of time to allow the antimony to react with the phosphor to produce a new phosphor having a half-life greater than the original phosphor.

2. The process of claim 1 wherein the inert reaction vessel is a thick walled quartz tube.

3. The process of claim 1 wherein the vapor permeable filter is quartz wool.

4. The process of claim 1 wherein the phosphor is an uncoated ZnS:Cu electroluminescent phosphor.

5. The process of claim 4 wherein the reaction vessel is heated from about 400° C. to about 600° C. for about 24 to about 96 hours.

* * * * *